United States Patent
Zheng

(10) Patent No.: US 11,815,116 B2
(45) Date of Patent: Nov. 14, 2023

(54) CONNECTING STRUCTURE

(71) Applicant: Yiwu Baosuo Network Technology Co., Ltd, Zhejiang (CN)

(72) Inventor: Bing Zheng, Zhejiang (CN)

(73) Assignee: Yiwu Baosuo Network Technology Co., Ltd, Yiwu (CN)

( * ) Notice: Subject to any disclaimer, the term of this patent is extended or adjusted under 35 U.S.C. 154(b) by 226 days.

(21) Appl. No.: 17/398,926

(22) Filed: Aug. 10, 2021

(65) Prior Publication Data
US 2021/0364025 A1 Nov. 25, 2021

(30) Foreign Application Priority Data

Jul. 14, 2021 (CN) .......................... 202110795628.5
Jul. 14, 2021 (CN) .......................... 202121603301.5

(51) Int. Cl.
*F16B 13/06* (2006.01)
*F16C 11/10* (2006.01)
*F16B 2/04* (2006.01)

(52) U.S. Cl.
CPC .............. *F16B 13/063* (2013.01); *F16B 2/04* (2013.01); *F16C 11/103* (2013.01); *Y10T 403/32319* (2015.01)

(58) Field of Classification Search
None
See application file for complete search history.

(56) References Cited

U.S. PATENT DOCUMENTS

| | | | | |
|---|---|---|---|---|
| 1,091,633 A | * | 3/1914 | Clemens ............... | F16C 11/106 278/80 |
| 2,984,249 A | * | 5/1961 | Sears, Jr. et al. ...... | A45B 11/00 135/21 |
| 4,127,119 A | * | 11/1978 | Kronner ................. | A61B 17/62 606/56 |
| 4,520,983 A | * | 6/1985 | Templeman ........ | F16C 11/0609 403/90 |
| 4,565,345 A | * | 1/1986 | Templeman .......... | F16C 11/106 403/90 |
| 5,118,058 A | * | 6/1992 | Richter .............. | F16M 11/2014 248/278.1 |

(Continued)

FOREIGN PATENT DOCUMENTS

| | | |
|---|---|---|
| CN | 1030793 C | 1/1996 |
| CN | 106438637 A | 2/2017 |
| CN | 106438638 A | 2/2017 |

*Primary Examiner* — Matthew R McMahon

(57) ABSTRACT

A connecting structure includes a coating component provided with a storage cavity and a first through hole, an expansion component provided with a second through hole and a first fastener. A part of the expansion component is stored in the storage cavity. The expansion component has a rotary state and a fixed state relative to the coating component. When the expansion component is in the rotary state, the expansion component can be rotated relative to the coating component. The first fastener can pass through the first through hole and extend into the second through hole to make the expansion component expand. The outer surface of the expansion component is pressed against the inner surface of the coating component to fix the expansion component in the coating component. The expansion component is in the fixed state relative to the coating component.

9 Claims, 2 Drawing Sheets

(56) References Cited

U.S. PATENT DOCUMENTS

| | | | | |
|---|---|---|---|---|
| 5,501,684 A * | 3/1996 | Schlapfer | ............ | A61B 17/7035 |
| | | | | 606/301 |
| 5,803,642 A * | 9/1998 | Sassmannshausen | ....................... | |
| | | | | F16M 11/14 |
| | | | | 403/122 |
| 8,308,392 B2 * | 11/2012 | Yu | ....................... | F16C 11/0604 |
| | | | | 403/144 |
| 9,709,356 B1 * | 7/2017 | Anstett | ................... | F41C 23/16 |
| 10,030,694 B2 * | 7/2018 | Kumar | ................. | F16C 11/106 |
| 10,087,982 B2 * | 10/2018 | Faccioli | ................. | F16C 11/06 |
| 11,134,988 B2 * | 10/2021 | Erickson | .............. | A61B 17/645 |
| 2008/0031683 A1 * | 2/2008 | Chao | ..................... | F16C 11/106 |
| | | | | 403/122 |

* cited by examiner ic No. 202121603301.5, filed on Jul. 14, 2020. The content of the
CONNECTING STRUCTURE

CROSS-REFERENCE TO RELATED APPLICATIONS

This application claims the benefit of priority from Chinese Patent Application No. 202110795628.5, filed on Jul. 14, 2021; and Chinese Patent Application No. 202121603301.5, filed on Jul. 14, 2020. The content of the aforementioned application, including any intervening amendments thereto, is incorporated herein by reference in its entirety.

TECHNICAL FIELD

The present invention relates to the technical field of mechanical connection and in particular to a connecting structure.

BACKGROUND OF THE PRESENT INVENTION

In a mechanical structure, in order to adjust position relations between components, adjustment is often realized by rotation in a connecting structure. However, fixation modes of connecting structures in the prior art are quite unstable after connection, so that performance of mechanical structures is quite unstable, and fault rates are high.

SUMMARY OF THE PRESENT INVENTION

Based on this, it is necessary to provide a connecting structure so as to solve the technical problems in the prior art that fixation modes of connecting structures in the prior art are quite unstable after connection, so that performance of mechanical structures is quite unstable, and fault rates are high.

The present invention provides a connecting structure which includes a coating component, an expansion component and a first fastener, wherein the coating component is provided with a storage cavity; a part of the expansion component is stored in the storage cavity; the coating component is provided with a first through hole; and the expansion component is provided with a second through hole.

The expansion component has a rotary state and a fixed state relative to the coating component; when the expansion component is in the rotary state relative to the coating component, the expansion component can be rotated relative to the coating component; the first fastener can pass through the first through hole and extend into the second through hole so as to make the expansion component expand; the outer surface of the expansion component is pressed against the inner surface of the coating component so as to fix the expansion component in the coating component; and the expansion component is in the fixed state relative to the coating component.

Further, the expansion component includes a first expansion part and a second expansion part, wherein the first expansion part and the second expansion part are abutted against each other; the first expansion part is provided with a first gap; the second expansion part is provided with a second gap; the second through hole is formed by enclosing of the first gap and the second gap.

The first expansion part and the second expansion part have a rotary state and a fixed state relative to the coating component; when the first expansion part and the second expansion part are in the rotary state, the first expansion part and the second expansion part are abutted against each other; and the first fastener extends into the second through hole, so that the first expansion part and the second expansion part are away from each other, and the outer surface of the first expansion part and the outer surface of the second expansion part are pressed against the inner surface of the coating component.

Further, the coating component includes a first coating part and a second coating part, wherein the first coating part and the second coating part are abutted against each other; the first coating part is provided with a third gap; the second coating part is provided with a fourth gap; the first through hole is formed by enclosing of the third gap and the fourth gap; and the storage cavity is formed by enclosing of the first coating part and the second coating part.

Further, the connecting structure includes a fixation component, wherein the fixation component is disposed on one side, away from the expansion component, of the first coating part and the second coating part; and the fixation component is used for fixing the first coating part and the second coating part together.

Further, the fixation component includes a base, wherein the base is provided with a groove; and the first coating part and the second coating part are jointly clamped in the groove.

Further, the fixation component further includes a locking part and a plurality of second fasteners, wherein the locking part is disposed on one side, away from the first coating part, of the base; the locking part is provided with a plurality of first threaded holes; the base is provided with a plurality of second threaded holes; the plurality of first threaded holes and the plurality of second threaded holes are in one-to-one correspondence; and the second fasteners pass through the first threaded holes and the second threaded holes and are in screwed connection with side walls of the first threaded holes and side walls of the second threaded holes.

Further, each second fastener is a threaded fastener.

Further, the connecting structure further includes a third fastener, wherein the coating component is provided with a third through hole opposite to the first through hole; the expansion component is provided with a fourth through hole opposite to the second through hole; and the third fastener can pass through the third through hole and extend into the fourth through hole.

Further, the first fastener and the third fastener are conical bolts; and the first through hole, the second through hole, the third through hole and the fourth through hole are conical holes.

Further, the part, stored in the storage cavity, of the expansion component is shaped like a cylindroid or an ellipsoid.

According to the connecting structure provided by the present invention, when the expansion component is in the rotary state relative to the coating component, the expansion component can be rotated relative to the coating component; the first fastener can pass through the first through hole and extend into the second through hole so as to make the expansion component expand; and the outer surface of the expansion component is pressed against the inner surface of the coating component so as to fix the expansion component in the coating component to enhance the stationarity of the connecting structure, enhance stabilization performance of a mechanical structure and reduce a fault rate.

BRIEF DESCRIPTION OF THE DRAWINGS

In order to illustrate technical solutions in embodiments of the present invention or in the prior art more clearly, accompanying drawings to be used in descriptions of the embodiments or the prior art will be introduced below briefly. Apparently, the accompanying drawings described below are only a part of embodiments of the present invention. Those ordinary skilled in the art can obtain other accompanying drawings according to structures illustrated in these accompanying drawings without making creative effort.

MAIN ELEMENTS 100. coating component; 110. first through hole; 110'. third through hole; 120. first coating part; 130. second coating part; 200. expansion component; 210. second through hole; 210'. fourth through hole; 220. first expansion part; 230. second expansion part; 300. first fastener; 310. second fastener; 320. third fastener; 400. fixation component; 410. base; and 420. locking part.

Implementation of purposes, functional characteristics and advantages of the present invention will be further illustrated in conjunction with the embodiments and with reference to the accompanying drawings.

DETAILED DESCRIPTION OF THE PRESENT INVENTION

The technical solutions in the embodiments of the present invention will be described clearly and completely in conjunction with accompanying drawings in the embodiments of the present invention. Apparently, the embodiments described are only a part of embodiments of the present invention, rather than all of the embodiments. Based on the embodiments in the present invention, all other embodiments obtained by those ordinary skilled in the art without making creative effort belong to the protection scope of the present invention.

It should be noted that, directional indications in the embodiments of the present invention (e.g., upper, lower, left, right, front, back . . . ) are only used for explaining relative position relations, motion situations or the like between different components under a specific posture (as shown in the accompanying drawings). When the specific posture is changed, the directional indications will change accordingly.

In addition, descriptions involving "first", "second" or the like in the present invention are only used for illustration, but should not be understood as indication or implication of relative importance or implicative indication of the quantity of indicated technical features. For this reason, features limited by "first" and "second" can directly indicate or imply inclusion of at least one feature. In addition, "and/or" in the whole description involves three solutions. For example, "A and/or B" includes a technical solution A, a technical solution B and a technical solution meeting conditions of both A and B. In addition, technical solutions in different embodiments can be mutually combined, which must be based on the fact that those ordinary skilled in the art can implement these technical solutions. It should be deemed that the technical solution combination is invalid when the combination of technical solutions is subject to mutual contradictions or cannot be implemented, and thus does not fall into the protection scope requested by the present invention.

Figure 1:
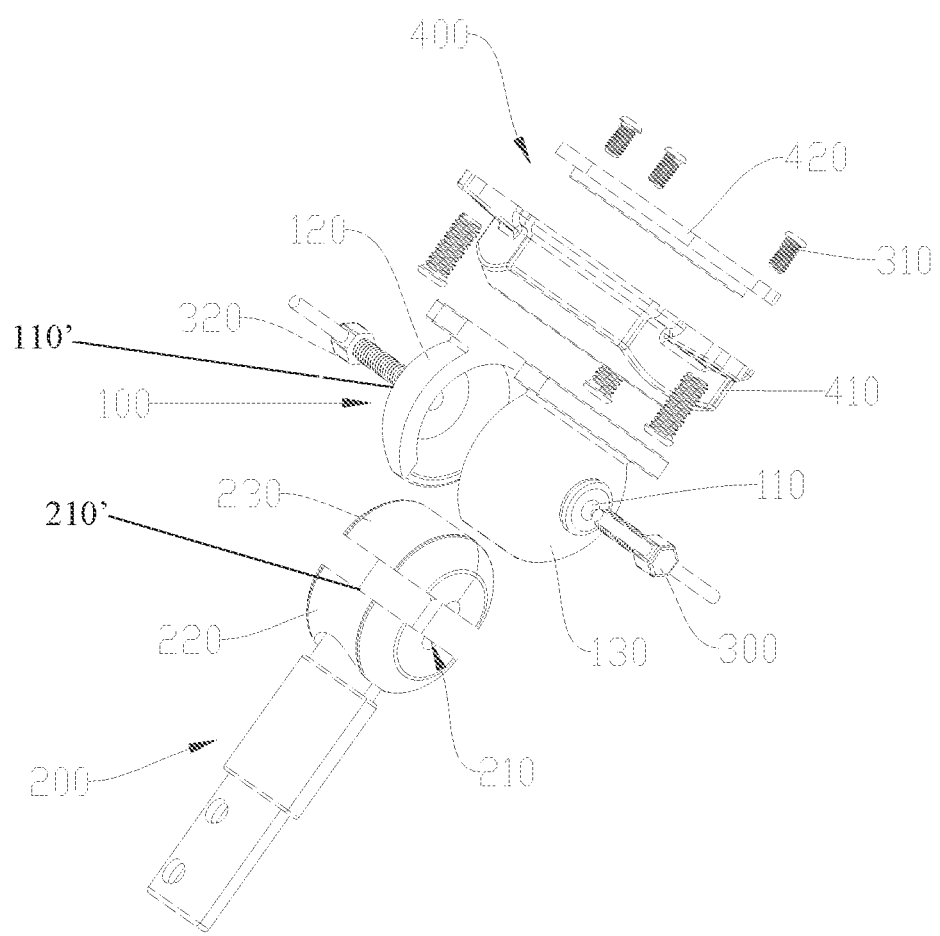
FIG. 1 is a structural schematic diagram of a connecting structure according to an embodiment of the present invention.

As shown in FIG. 1, in some embodiments, a connecting structure includes a coating component 100, an expansion component 200 and a first fastener 300. The coating component 100 is provided with a storage cavity; a part of the expansion component 200 is stored in the storage cavity; the coating component 100 is provided with a first through hole 110; the expansion component 200 is provided with a second through hole 210; the expansion component 200 has a rotary state and a fixed state relative to the coating component 100; when the expansion component 200 is in the rotary state relative to the coating component 100, the expansion component 200 can be rotated relative to the coating component 100; the first fastener 300 can pass through the first through hole 110 and extend into the second through hole 210 so as to make the expansion component 200 expand; the outer surface of the expansion component 200 is pressed against the inner surface of the coating component 100 so as to fix the expansion component 200 in the coating component 100; and the expansion component 200 is in the fixed state relative to the coating component 100, so as to enhance stationarity of the connecting structure, enhance stabilization performance of a mechanical structure and reduce a fault rate.

Specifically, the expansion component 200 includes a first expansion part 220 and a second expansion part 230. The first expansion part 220 and the second expansion part 230 are abutted against each other; the first expansion part 220 is provided with a first gap; the second expansion part 230 is provided with a second gap; the second through hole is formed by enclosing of the first gap and the second gap; the first expansion part 220 and the second expansion 230 have a rotary state and a fixed state relative to the coating component 100; when the first expansion part 220 and the second expansion part 230 are in the rotary state, the first expansion part 220 and the second expansion part 230 are abutted against each other; and the first fastener 300 extends into the second through hole 210, so that the first expansion part 220 and the second expansion part 230 are away from each other, and the outer surface of the first expansion part 220 and the outer surface of the second expansion part 230 are pressed against the inner surface of the coating component 100.

Further, the coating component 100 includes a first coating part 120 and a second coating part 130. The first coating part 120 and the second coating part 130 are abutted against each other; the first coating part 120 is provided with a third gap; the second coating part 130 is provided with a fourth gap; the first through hole 110 is formed by enclosing of the third gap and the fourth gap; and the storage cavity is formed by enclosing of the first coating part 120 and the second coating part 130.

In some embodiments, the connecting structure includes a fixation component 400. The fixation component 400 is disposed on one side, away from the expansion component 200, of the first coating part 120 and the second coating part 130; and the fixation component 400 is used for fixing the first coating part 120 and the second coating part 130 together.

Specifically, the fixation component 400 includes a base 410; the base 410 is provided with a groove; and the first coating part 120 and the second coating part 130 are jointly clamped in the groove.

Figure 2:
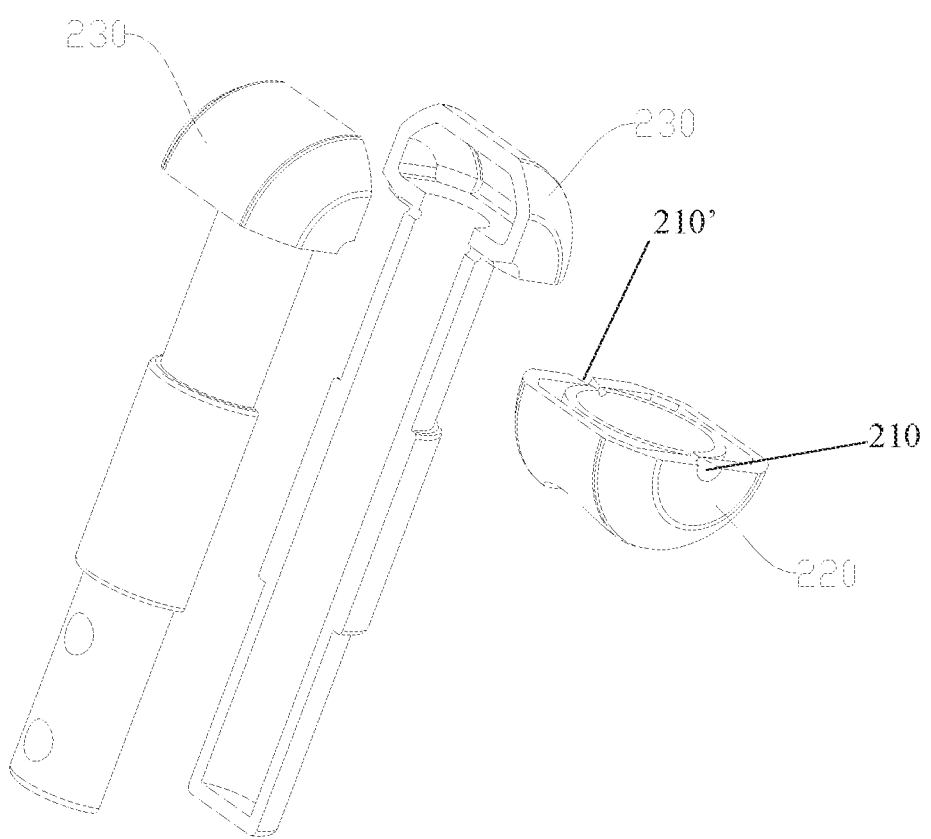
FIG. 2 is a structural schematic diagram of an expansion component according to another embodiment of the present invention.

As shown in FIG. 2, in another embodiment, the second expansion part 230 may be of a split structure, and the second expansion part 230 is sleeved in the first expansion part 220.

Further, the fixation component 400 further includes a locking part 420 and a plurality of second fasteners 310; the locking part 420 is disposed on one side, away from the first coating part 120, of the base 410; the locking part 420 is provided with a plurality of first threaded holes; the base 410 is provided with a plurality of second threaded holes; the plurality of first threaded holes and the plurality of second threaded holes are in one-to-one correspondence; the second fasteners 310 pass through the first threaded holes and the second threaded holes and are in screwed connection with side walls of the first threaded holes and side walls of the second threaded holes; and each second fastener 310 is a threaded fastener.

In work, when the first expansion part 220 and the second expansion part 230 are strutted to expand, the first coating part 120 and the second coating 130 will be extruded, so that the first coating part 120 and the second coating part 130 expand outwards. The first coating part 120 and the second coating part 130 are jointly clamped in the groove of the base 410. Then, the first coating part 120 and the second coating part 130 are locked together tightly through arrangement of the locking part 420 and the plurality of second fasteners 310.

In some embodiments, the connecting structure further includes a third fastener 320. The coating component 100 is provided with a third through hole 110' opposite to the first through hole 110; the expansion component 200 is provided with a fourth through hole 210' opposite to the second through hole 210; and the third fastener 320 can pass through the third through hole 110' and extend into the fourth through hole 210'. Through arrangement of the third fastener 320, the first fastener 300 and the third fastener 320 can be coordinated to make both sides of the first expansion part 220 and the second expansion part 230 expand at the same time, so that structural stationarity is enhanced.

Specifically, the first fastener 300 and the third fastener 320 are conical bolts; and the first through hole 110, the second through hole 210, the third through hole 110' and the fourth through hole 210' are conical holes. In work, the first expansion part 220 and the second expansion part 230 are abutted against each other; the first coating part 120 and the second coating part 130 are abutted against each other; the first expansion part 220 and the second expansion part 230 are stored in the storage cavity formed by enclosing of the first coating part 120 and the second coating part 130 (the first expansion part 220 and the second expansion part 230 are jointly coated by the first coating part 120 and the second coating part 130); and the first expansion part 220 and the second expansion part 230 have degrees of freedom relative to the first coating part 120 and the second coating part 130. When fixation is needed, the conical bolts pass through the conical holes of the first coating part 120 and the second coating part 130 and are then driven spirally into the conical holes of the first expansion part 220 and the second expansion part 230, so that the first expansion part 220 and the second expansion part 230 are strutted to expand.

The part, stored in the storage cavity, of the expansion component 200 is shaped like a cylindroid or an ellipsoid.

The above only describes preferred embodiments of the present invention, and is not intended to limit a patent scope of the present invention. Equivalent structural transformation made according to the description or accompanying drawings of the present invention based on the inventive concept of the present invention or direct/indirect application thereof in other related technical fields are included in the patent protection scope of the present invention.

I claim:

1. A connecting structure, comprising a coating component, an expansion component and a threaded first fastener, wherein the coating component is provided with a storage cavity; a part of the expansion component is stored in the storage cavity; the coating component is provided with a threaded first through hole; and the expansion component is provided with a second through hole;

the expansion component has a rotary state and a fixed state relative to the coating component; when the expansion component is in the rotary state relative to the coating component, the expansion component can be rotated relative to the coating component; the first fastener can pass through the first through hole and extend into the second through hole so as to make the expansion component expand; the outer surface of the expansion component is pressed against the inner surface of the coating component so as to fix the expansion component in the coating component; when the expansion component is in the fixed state relative to the coating component; and the connecting structure further comprises a threaded second fastener; the coating component is provided with a threaded third through hole opposite to the first through hole; the expansion component is provided with a fourth through hole opposite to the second through hole; and the second fastener passes through the third through hole and extends into the fourth through hole.

2. The connecting structure according to claim 1, wherein the expansion component comprises a first expansion part and a second expansion part; the first expansion part and the second expansion part are abutted against each other; the first expansion part is provided with a first gap; the second expansion part is provided with a second gap; the second through hole is formed by enclosing of the first gap and the second gap; and the first expansion part and the second expansion part have a rotary state and a fixed state relative to the coating component; when the first expansion part and the second expansion part are in the rotary state, the first expansion part and the second expansion part are abutted against each other; and the first fastener extends into the second through hole, so that the first expansion part and the second expansion part are moved away from each other, and the outer surface of the first expansion part and the outer surface of the second expansion part are pressed against the inner surface of the coating component.

3. The connecting structure according to claim 1, wherein the coating component comprises a first coating part and a second coating part; the first coating part and the second coating part are abutted against each other; and the storage cavity is formed by enclosing of the first coating part and the second coating part.

4. The connecting structure according to claim 3, wherein the connecting structure comprises a fixation component; the fixation component is disposed on one side, away from the expansion component, of the first coating part and the second coating part; and the fixation component is used for fixing the first coating part and the second coating part together.

5. The connecting structure according to claim 4, wherein the fixation component comprises a base.

6. The connecting structure according to claim 5, wherein the fixation component further comprises a locking part and a plurality of third fasteners; and the locking part is disposed on one side, away from the first coating part, of the base.

7. The connecting structure according to claim 6, wherein each third fastener is a threaded fastener.

8. The connecting structure according to claim 1, wherein the first fastener and the second fastener are conical bolts; and the second through hole and the fourth through hole are conical holes.

9. The connecting structure according to claim 1, wherein the part, stored in the storage cavity, of the expansion component is shaped like a cylindroid or an ellipsoid.

\* \* \* \* \*